(12) United States Patent
Xu et al.

(10) Patent No.: US 11,941,027 B2
(45) Date of Patent: Mar. 26, 2024

(54) SCALE-OUT OF DATABASE SYSTEMS IN CLOUD COMPUTING ENVIRONMENTS

(71) Applicant: SAP SE, Walldorf (DE)

(72) Inventors: De-Li Xu, Xi'an (CN); Zhi-peng Dong, Xi'am (CN)

(73) Assignee: SAP SE, Walldorf (DE)

( * ) Notice: Subject to any disclaimer, the term of this patent is extended or adjusted under 35 U.S.C. 154(b) by 36 days.

(21) Appl. No.: 17/747,123

(22) Filed: May 18, 2022

(65) Prior Publication Data

US 2023/0409599 A1    Dec. 21, 2023

(51) Int. Cl.
G06F 16/17      (2019.01)
G06F 16/23      (2019.01)
G06F 16/27      (2019.01)
H04L 67/1097    (2022.01)

(52) U.S. Cl.
CPC ........ G06F 16/273 (2019.01); G06F 16/2379 (2019.01); H04L 67/1097 (2013.01)

(58) Field of Classification Search
CPC . G06F 16/273; G06F 16/2379; H04L 67/1097
See application file for complete search history.

(56) References Cited

U.S. PATENT DOCUMENTS

| | | | |
|---|---|---|---|
| 8,726,242 B2* | 5/2014 | Ngo | G06F 16/178 707/648 |
| 2006/0242297 A1* | 10/2006 | Aronoff | H04L 67/1029 709/225 |
| 2012/0005154 A1* | 1/2012 | George | G06F 16/273 707/607 |
| 2015/0379451 A1* | 12/2015 | Balko | G06F 9/5055 705/7.26 |
| 2018/0095914 A1* | 4/2018 | Kondiles | G06F 13/4282 |
| 2018/0150356 A1* | 5/2018 | Boshev | G06F 11/2094 |
| 2018/0322184 A1* | 11/2018 | Voss | G06F 16/2358 |
| 2019/0238456 A1* | 8/2019 | Wang | H04L 9/0891 |
| 2020/0233833 A1* | 7/2020 | Zhu | G06F 3/061 |
| 2020/0250169 A1* | 8/2020 | Lee | G06F 16/2358 |
| 2021/0035381 A1* | 2/2021 | Wu | G05B 23/0208 |
| 2021/0081268 A1* | 3/2021 | Bando | H04L 69/40 |
| 2021/0124710 A1* | 4/2021 | Izenberg | G06F 15/167 |
| 2021/0405874 A1* | 12/2021 | Kono | G06F 3/067 |

* cited by examiner

*Primary Examiner* — Etienne P Leroux
(74) *Attorney, Agent, or Firm* — Fish & Richardson P.C.

(57) ABSTRACT

Methods, systems, and computer-readable storage media for providing a first instance of a database system within the cloud computing environment, determining that scale out of the database system is to be executed, and in response, providing a second instance of the database system within the cloud computing environment, the first instance and the second instance collectively defining a cluster, establish a remote direct memory access (RDMA) connection between the first instance and the second instance, copying data stored within the first instance to a data store of the second instance over the RDMA connection, and configuring the first instance to replicate a first transaction log to the second instance over the RDMA connection, and receiving, by each of the first instance and the second instance, requests from one or more client devices.

17 Claims, 5 Drawing Sheets

SCALE-OUT OF DATABASE SYSTEMS IN CLOUD COMPUTING ENVIRONMENTS

BACKGROUND

Enterprises can use enterprise applications to support and execute operations. Enterprise applications can be deployed in cloud computing environments, which includes execution of the enterprise applications within a data center of a cloud-computing provider (e.g., as part of an infrastructure-as-a-service (IaaS) offering). Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand.

SUMMARY

Implementations of the present disclosure are directed to scaling of database systems in cloud computing environments. More particularly, implementations of the present disclosure are directed to automated scaling of a database system in a cloud computing environment using remote direct memory access (RDMA).

In some implementations, actions include providing a first instance of a database system within the cloud computing environment, determining that scale out of the database system is to be executed, and in response, providing a second instance of the database system within the cloud computing environment, the first instance and the second instance collectively defining a cluster, establish a remote direct memory access (RDMA) connection between the first instance and the second instance, copying data stored within the first instance to a data store of the second instance over the RDMA connection, and configuring the first instance to replicate a first transaction log to the second instance over the RDMA connection, and receiving, by each of the first instance and the second instance, requests from one or more client devices. Other implementations of this aspect include corresponding systems, apparatus, and computer programs, configured to perform the actions of the methods, encoded on computer storage devices.

These and other implementations can each optionally include one or more of the following features: the first instance replicates the first transaction log to the second instance in response to completion of a transaction within the first instance; the transaction includes at least one write operation; actions further include configuring the second instance to replicate a second transaction log to the first instance over the RDMA connection; actions further include determining that scale in of the database system is to be executed, and in response, setting the second instance to an offline status, completing one or more transactions, migrating one or more connections of one or more client devices from the second instance to the first instance, and executing a shutdown of the second instance; actions further include stopping replication of the first transaction log to the second instance; and actions further include replicating a second transaction log of the second instance to the first instance after completion of the one or more transactions.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
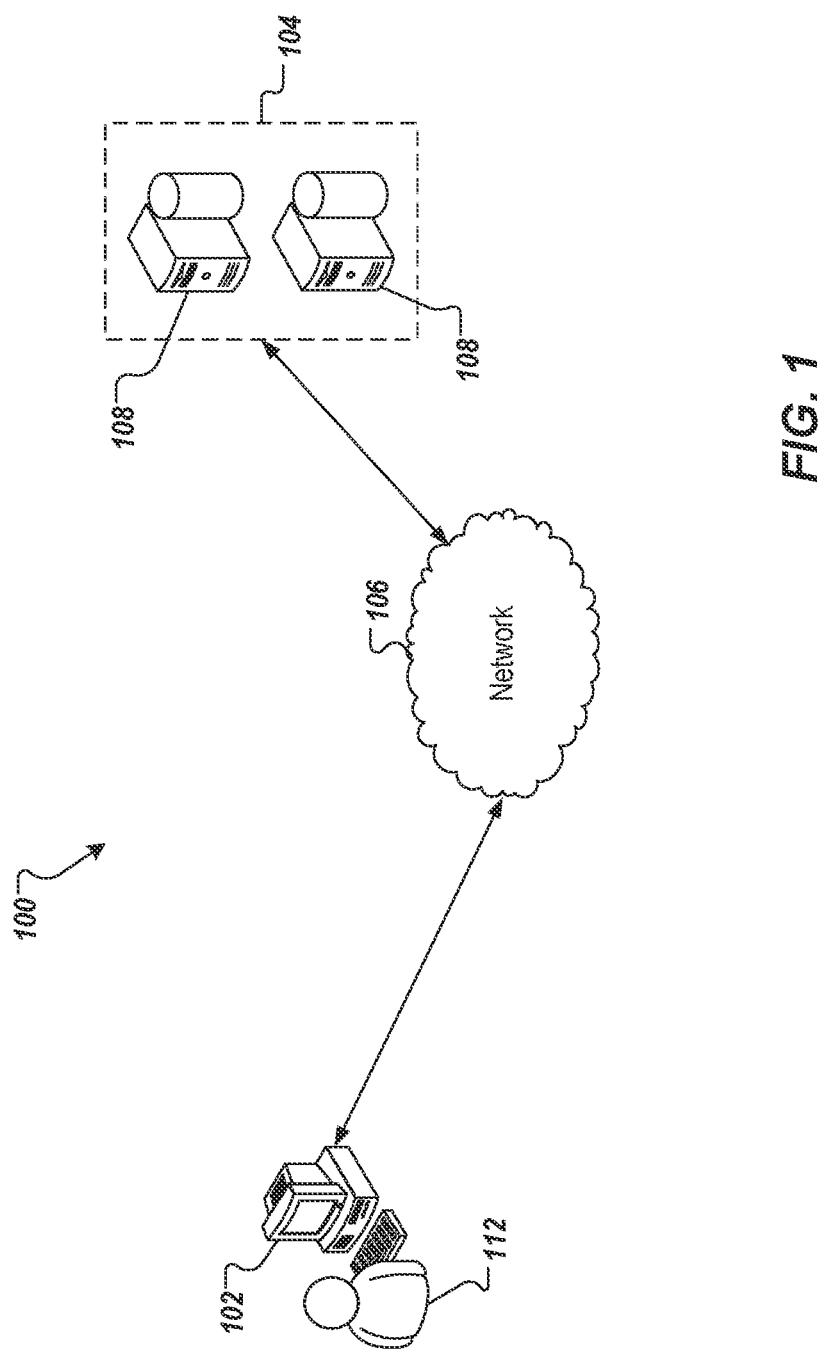
FIG. 1 depicts an example architecture that can be used to execute implementations of the present disclosure.

Implementations of the present disclosure are directed to scaling of database systems in cloud computing environments. More particularly, implementations of the present disclosure are directed to automated scaling of a database system in a cloud computing environment using remote direct memory access (RDMA). Implementations can include actions of providing a first instance of a database system within the cloud computing environment, determining that scale out of the database system is to be executed, and in response, providing a second instance of the database system within the cloud computing environment, the first instance and the second instance collectively defining a cluster, establish a remote direct memory access (RDMA) connection between the first instance and the second instance, copying data stored within the first instance to a data store of the second instance over the RDMA connection, and configuring the first instance to replicate a first transaction log to the second instance over the RDMA connection, and receiving, by each of the first instance and the second instance, requests from one or more client devices.

To provide further context for implementations of the present disclosure, enterprises can use enterprise applications to support and execute operations. Enterprise applications can be deployed in cloud-computing environments, which includes execution of the enterprise applications within a data center of a cloud-computing provider (e.g., as part of an infrastructure-as-a-service (IaaS) offering). Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand.

Scaling can include scaling up/down and/or scaling out/in. In general, scaling up/down refers to scaling of technical resources, such as processors and memory, for an instance of an application, such as a database system. That is, capacity (in terms of processors/memory) can be increased (scale up) to enable an instance to handle higher demand (more requests) or can be decreased (scale down) when there is lower demand on the instance. On the other hand, scaling out/in refers to scaling of instances of the application. That is, a number of instances of the application can be increased (scale out) to provide more instances for handling higher demand or can be decreased (scale in) when there is lower demand across all instances.

Scaling up/down or out/in of a single system presents certain disadvantages. For example, if technical resources are scaled up, scale down of the resources is not a self-service task. That is, if demand is reduced and the increased technical resources are no longer required, the enterprise, on behalf of which the instance is being executed in the cloud computing environment, has to create a service ticket to assign the scale down task to internal support of the cloud computing environment. Technical resources of the cloud computing environment are wasted during the period from creating the service ticket to the eventual scale down of the technical resources. Further, downtime is required during scale up and scale down. That is, the instance of the application is unavailable to handle requests while scale up and/or scale down are being performed. As another example, scale out of a single system cannot be achieved without disruption to users.

In view of this, and as described in further detail herein, implementations of the present disclosure provide for zero downtime scale out and scale in of a single system (e.g., a system executing on a single computing device), such as a database system. In accordance with implementations of the present disclosure, scale out/in can each be performed as a self-service (e.g., without creating a service ticket) and enables enterprises to directly, quickly, and resource-efficiently handle demand fluctuations with the cloud computing environment.

FIG. 1 depicts an example architecture 100 in accordance with implementations of the present disclosure. In the depicted example, the example architecture 100 includes a client device 102, a network 110, and server systems 104, 106. The server systems 104, 106 each include one or more server devices and databases 108 (e.g., processors, memory). In the depicted example, a user 112 interacts with the client device 102.

In some examples, the client device 102 can communicate with the server system 104 and/or the server system 106 over the network 110. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each of the server systems 104, 106 includes at least one server and at least one data store. In the example of FIG. 1, the server systems 104, 106 are intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can provide a cloud computing environment to host one or more systems, such as a database system, that support operations of an enterprise. In some implementations, and as described in further detail herein, instances of a system can be scaled out/in using RDMA.

In further detail, implementations of the present disclosure enable instances of a system, such as a database system, to communicate with one another using RDMA. In general, RDMA can be described as enabling computers in a network to exchange data in main memory without involving the processor, cache, or operating system of either computer. RDMA enables relatively high data transfer rates and low-latency networking, and supports zero-copy networking. To achieve this, the network adapter transfers data directly to/from the application memory without copying data between application memory and data buffers in the operating system. Implementations of the present disclosure use a RDMA network to synchronize data and logs between an initial instance of a database system and a scale out instance of the database system.

Figure 2:
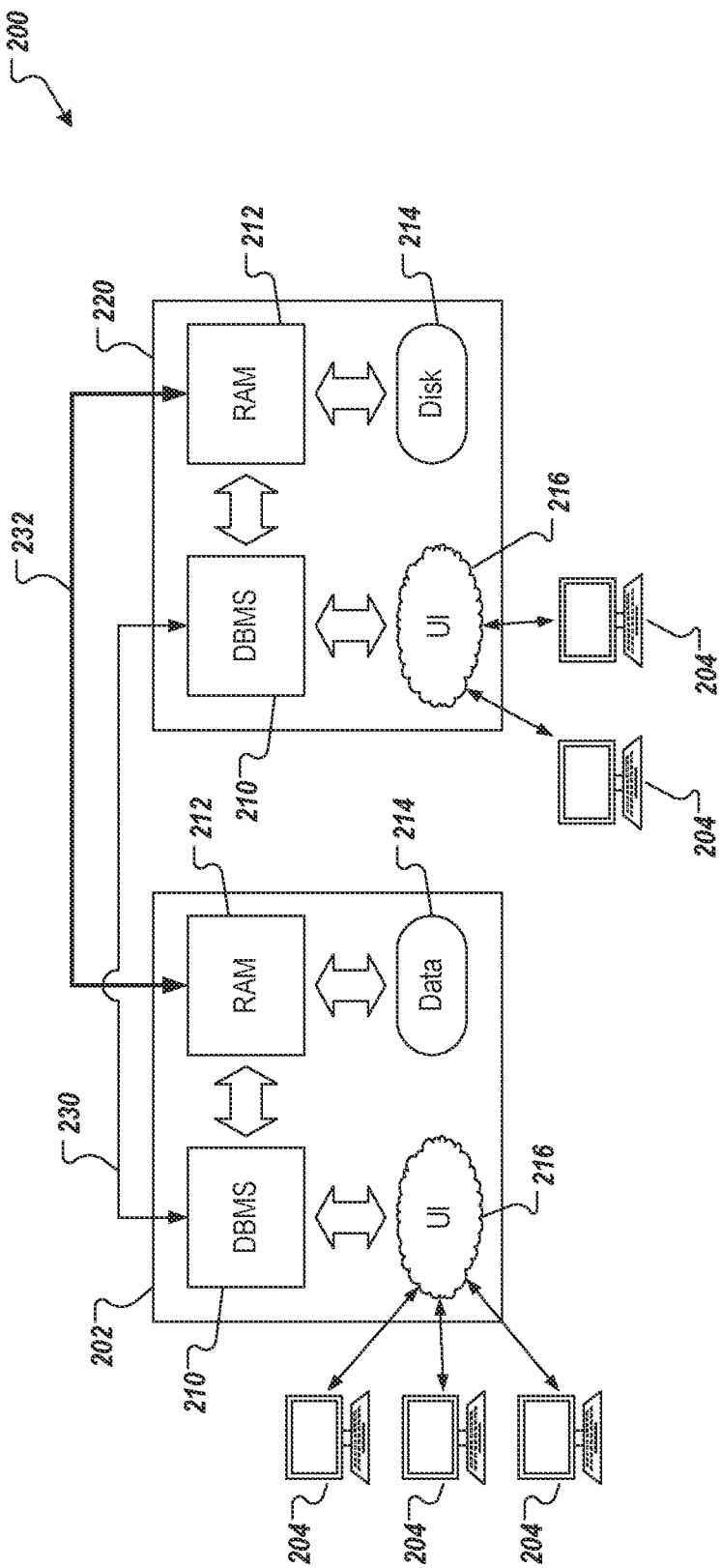
FIG. 2 depicts an example conceptual architecture for scale out of systems in cloud computing environments in accordance with implementations of the present disclosure.

FIG. 2 depicts an example conceptual architecture 200 for scale out of systems in cloud computing environments in accordance with implementations of the present disclosure. In the depicted example, the conceptual architecture 200 includes a first instance 202 of a database system and client devices 204 that interact with the first instance. For example, the client devices 204 can send requests to and receive responses from the first instance 202. In the context of a database system, the requests can include transactions to query the database system. Example transactions can include read (e.g., reading data from one or more tables stored in the database system) and write (e.g., writing data to one or more tables stored in the database system).

In the example of FIG. 2, the first instance 202 includes a database management system (DBMS) 210, random access memory (RAM) 212, a data store 214, and an interface system 216. In some examples, the DBMS 210 receives requests from one or more of the client devices 204 through the interface system 216 and, in response, executes transactions on data of one or more tables stored in the data store 214. In some instances, the DBMS 210 sends a response to a client device 204 through the interface system 216.

In accordance with implementations of the present disclosure, the first instance 202 can be an initial and only instance of the database system within a cloud computing environment during a first period of time. It can be determined that the database system is to be scaled out. That is, it can be determined that another instance of the database system is to be made available in the cloud computing environment. In some examples, scaling of the database system is determined based on a schedule (e.g., the database system is scaled out at a scheduled time, the database system is scaled in at a scheduled time). In some examples, scaling of the database system is determined in response to monitoring load (e.g., a number of requests) on the database system (e.g., the database system is scaled out in response to the load meeting or exceeding a threshold load, the database system is scaled in in response to the load falling below a threshold load).

In response to determining that the database system is to be scaled out, a second instance 220 (scaled out instance) of the database system is created within the cloud computing environment. By way of non-limiting example, the cloud computing environment can include Kubernetes. An operator pod within Kubernetes can create the second instance 220 (e.g., within a respective pod). The second instance 220 includes the database management system 210, the RAM 212, the data store 214, and the interface system 216 to handle requests from client devices 204. Accordingly, the first instance 202 and the second instance 220 can be referred to as a cluster within the cloud computing environment.

After the second instance 220 is created, data is synchronized between the first instance 202 and the second instance 220. Data synchronization can include share disk and share nothing. Share disk has heightened requirements (e.g., separate share disk network, I/O fencing) as compared to share nothing. In view of this, implementations of the present disclosure can use share nothing.

A cluster communication 230 and a RDMA connection 232 are established between the first instance 202 and the second instance 220. In some examples, respective address and port information are provided to each of the first instance 202 and the second instance 220, which establish the cluster communication 230 therebetween. After the cluster communication 230 is created, RDMA information (e.g., RDMA address, port, memory region, RDMA keys, buffer address) are communicated between the first instance 202 and the second instance 220, which use the RDMA information to establish the RDMA connection 232. In general, the cluster communication 230 manages the RDMA connection, and is used to monitor the status of the cluster status monitor. The cluster communication 230 is established by the first instance 202 receiving server information of the second instance 232 provided by a cluster system (e.g., Kubernetes).

In some examples, data synchronization between the first instance 202 and the second instance 220 is executed through the RDMA connection 232. The data synchronization can include copying the data (data tables) stored in the data store 214 of the first instance 202 to the data store 214 of the second instance 220. In some examples, the RDMA connection 232 provides high-speed network transfer between the RAM 212 of the first instance 202 and the RAM of the second instance 220. In some examples, a sustained data transfer rate of approximately 39 Gbps is achieved using RDMA over Converged Ethernet (RoCE). At such a data transfer rate, it is possible to transfer approximately 420 TB of data in 24 hours. Accordingly, the data transfer process can be completed in a relatively short period of time. For example, for database systems having data in the 50–1000 GB range, the data synchronization process can be executed in minutes.

After data synchronization is completed, a real-time log synchronization is established. In some examples, the real-time log synchronization is provided as a uni-directional replicate path in cases where write transactions are only to be executed on one instance (e.g., the first instance 202). In some examples, the real-time log synchronization is provided as a bi-directional replicate path in cases where write transactions are to be executed on both instances. Because the RDMA connection 232 supports high throughput, the log can be transferred in fully synchronized manner (i.e., bi-directional) with low latency. This ensures that that data on both instances is the same, which is particularly relevant in cases of write transactions being executed in multiple instances. Further, replication of the log is executed in real-time to minimize any period of time in which logs could be inconsistent. As used herein, real-time refers to transmitting or processing data given the processing limitations of a system and without intentional delay.

Figure 3A:
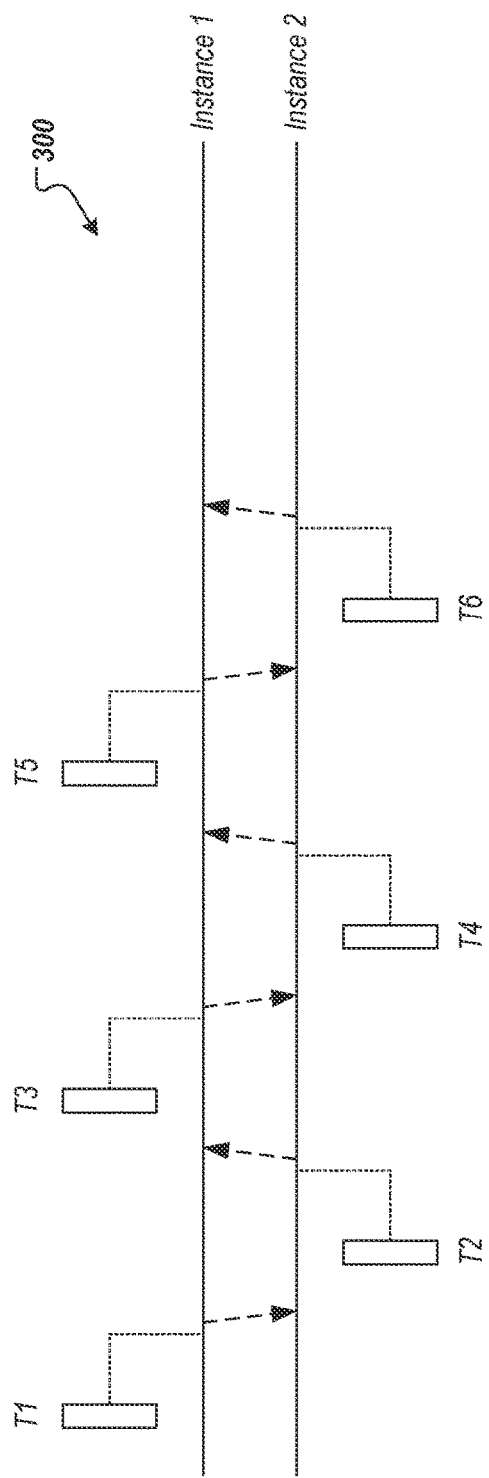
FIGS. 3A and 3B depict examples of respective transaction timelines in accordance with implementations of the present disclosure.
Figure 3B:
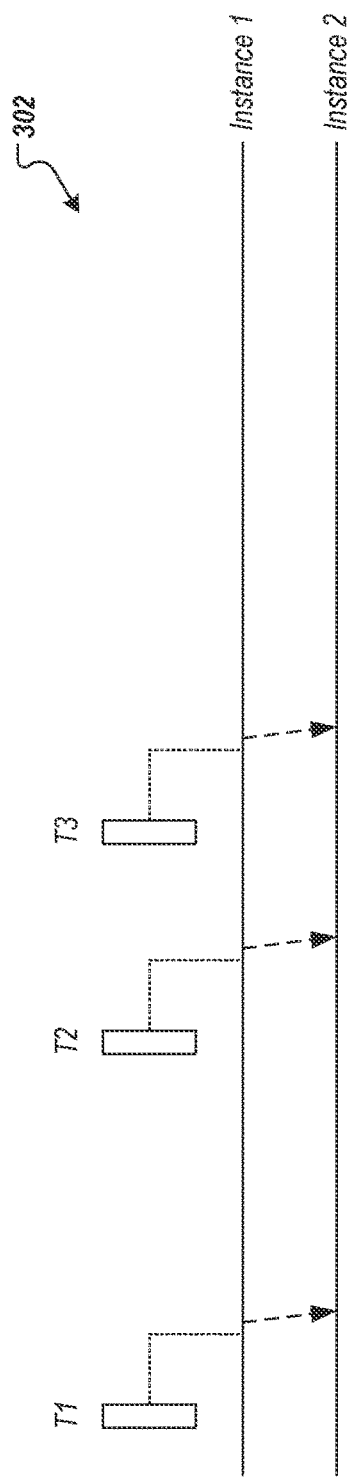

FIGS. 3A and 3B depict examples of respective transaction timelines 300, 302 in accordance with implementations of the present disclosure.

The transaction timeline 300 of FIG. 3A represents a scenario, in which both instances are able to execute write operations. Consequently, bi-directional real-time log synchronization is provided over the RDMA connection. In the example of FIG. 3A, a series of transactions {T1, T2, T3 . . . } are executed in alternate. After a transaction is committed by an instance, the log of the instance is replicated to the other instance in real-time (immediately) through the RDMA connection. Because the transfer speed over the RDMA connection is relatively close to the RAM write speed (e.g., 5 GB/s—RDMA, 6 GB/s—RAM), the log replicate time cost is close to RAM write. To ensure the integrity of write operation on both instances, a transaction executed at one instance is only marked completed after the log is replicated at the other instance. In some examples, an instance utilizes write-ahead logging (WAL) to keep atomicity, consistency, isolation, durability (ACID) properties of transactions. In WAL, changes are first recorded in the log before the changes are written to the database. In some examples, the transaction log generated in an instance, referred to as a local instance, is organized into packages and is sent to the other instance, which can be referred to as a remote instance. In the remote instance, once the log package is received and persisted, an acknowledge (ACK) package is sent back to confirm the specific log has been received. In synchronization mode, the local instance cannot commit the transaction until the commit ACK package has been received from the remote instance.

The transaction timeline 302 of FIG. 3B represents a scenario, in which only one instance is able to execute write operations, while the other instance is limited to read-only. In some examples, when the log is replicated, the other instance (remote instance) updates its local database to reflect the write operation(s). In this manner, both instances are consistent in terms of data in the database.

In some implementations, it can be determined that scale in is to be executed to reduce the number of instances. In view of share nothing, the RDMA connection to an instance can be closed and the instance can be stopped. In some examples, the instance is marked as offline within the cloud computing environment. In this manner, no new requests are sent to the instance offline. Any transactions that are completed within the instance are committed and the log of the instance is replicated to the other instance. If a transaction does not complete before a timeout condition occurs, the transaction is aborted. After all transactions are either committed or aborted, the instance stops the RDMA connection and migrates exiting connections to the other instance (i.e., the live instance that is to remain). The instance is removed from the cluster and is shutdown to complete the scale in process.

Figure 4:
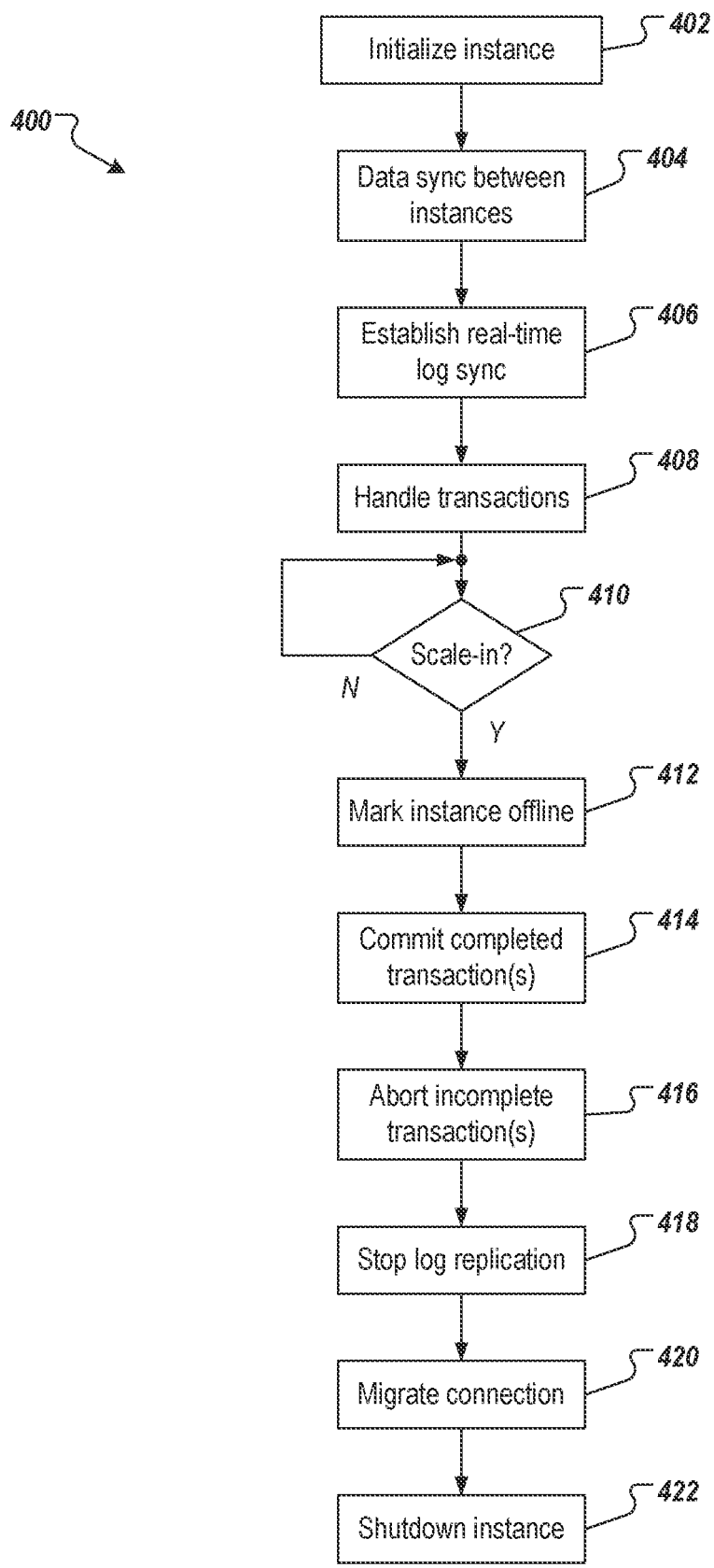
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices. In some examples, the example process 400 of FIG. 4 is initiated in response to a determination that a system is to be scaled out (e.g., another instance of the system is to be instantiated in a cloud computing environment). For example, a first instance of the system can be executing and it is determined that a second instance of the system is to be provided.

The second instance of the system is initialized (402). Data is synchronized between the first instance and the second instance (404). For example, and as described herein, a RDMA connection is established between the first instance and the second instance and data from the first instance is copied to the second instance. A real-time log synchronization is established (406). For example, and as described herein, the first instance is configured to replicate its log to the second instance. In the case of write operations being able to be performed on all instances, the second instance is configured to replicate its log to the first instance.

Transactions are handled (408). For example, and as described herein, requests are transmitted to the first instance and/or the second instance, which respectively handle the requests. For any write operations, log replication is performed after a transaction is complete. For example, the first instance replicates its log to the second instance after a transaction that includes a write operation is complete. In the case where the second instance can perform write operations, the second instance replicates its log to the first instance after a transaction that includes a write operation is complete.

It is determined whether scale in is to be performed (410). For example, and as described herein, scale in can be performed in response to a schedule and/or a load condition. If scale in is to be performed, the second instance is marked as offline (412). Completed transactions are committed (414) and any incomplete transactions that have reached a timeout condition are aborted (416) within the second instance. In the case of write operations being able to be performed on all instances, the log of the second instance is replicated to the first instance after each transaction is completed. Log replication is stopped (418) and the connections to the second instance are migrated to the first instance (420). For example, and as described herein, the connections of client devices that had been connected to the second instance are migrated to the first instance. The instance is shut down within the cloud computing environment (422).

Figure 5:
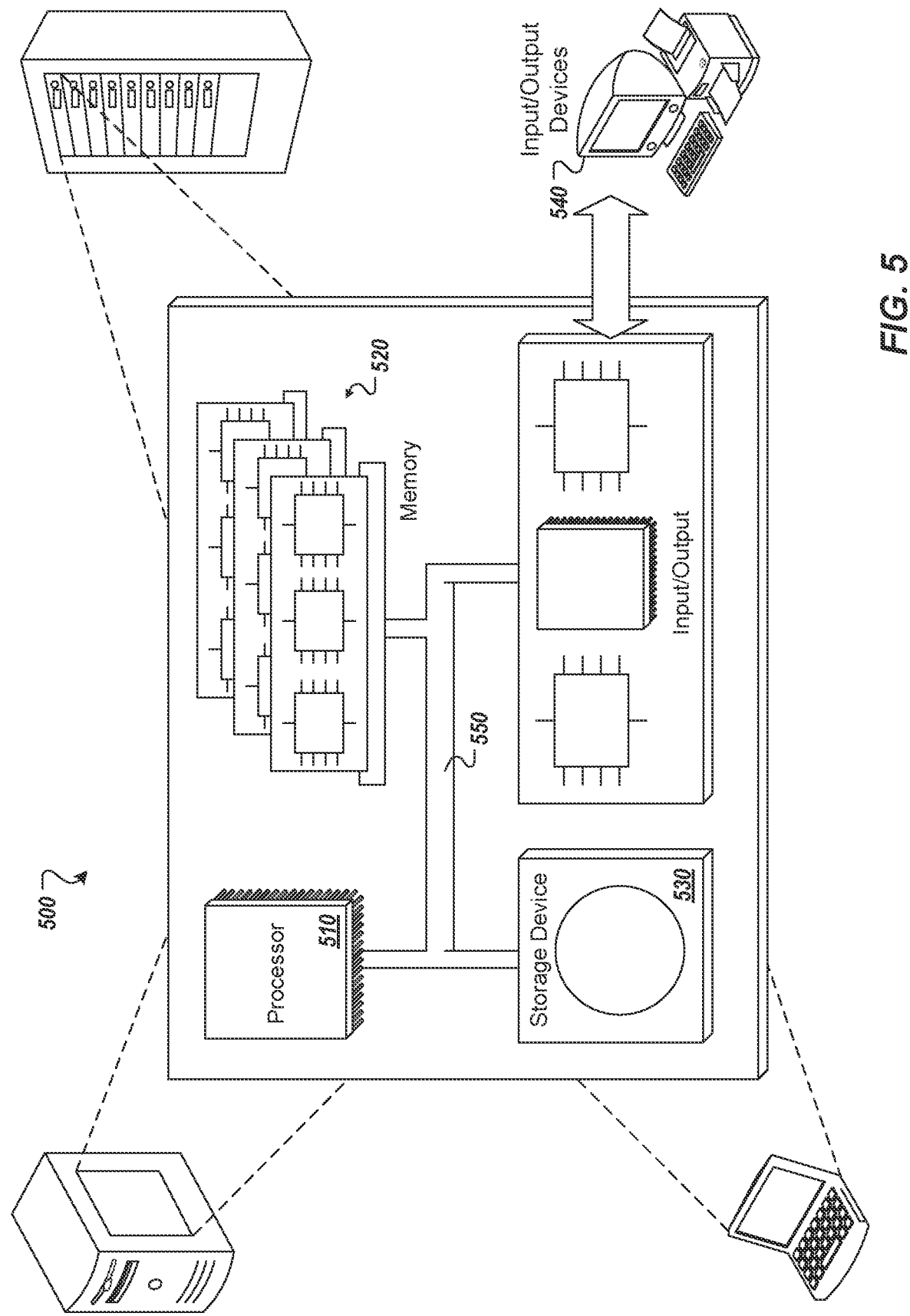
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for scaling of a system executed within a cloud computing environment, the method being executed by one or more processors and comprising:
   providing a first instance of a database system within the cloud computing environment;
   determining that scale out of the database system is to be executed, and in response:
      providing a second instance of the database system within the cloud computing environment, the first instance and the second instance collectively defining a cluster,
      establishing a remote direct memory access (RDMA) connection between the first instance and the second instance to exchange data in main memory,
      copying data stored within the first instance to a data store of the second instance over the RDMA connection, and
      configuring the first instance to replicate a first transaction log to the second instance over the RDMA connection;
   receiving, by each of the first instance and the second instance, requests from one or more client devices; and
   determining that scale in of the database system is to be executed, and in response:
      setting the second instance to an offline status,
      migrating one or more connections of one or more client devices from the second instance to the first instance, and
      executing a shutdown of the second instance.

2. The method of claim 1, wherein the first instance replicates the first transaction log to the second instance in response to completion of a transaction within the first instance.

3. The method of claim 2, wherein the transaction comprises at least one write operation.

4. The method of claim 1, further comprising configuring the second instance to replicate a second transaction log to the first instance over the RDMA connection.

5. The method of claim 1, further comprising stopping replication of the first transaction log to the second instance.

6. The method of claim 1, further comprising replicating a second transaction log of the second instance to the first instance after completion of one or more transactions.

7. A non-transitory computer-readable storage medium coupled to one or more processors and having instructions stored thereon which, when executed by the one or more processors, cause the one or more processors to perform operations for scaling of a system executed within a cloud computing environment, the operations comprising:
   providing a first instance of a database system within the cloud computing environment;
   determining that scale out of the database system is to be executed, and in response:
      providing a second instance of the database system within the cloud computing environment, the first instance and the second instance collectively defining a cluster,
      establishing a remote direct memory access (RDMA) connection between the first instance and the second instance to exchange data in main memory,
      copying data stored within the first instance to a data store of the second instance over the RDMA connection, and
      configuring the first instance to replicate a first transaction log to the second instance over the RDMA connection;
   receiving, by each of the first instance and the second instance, requests from one or more client devices; and
   determining that scale in of the database system is to be executed, and in response:
      setting the second instance to an offline status,
      migrating one or more connections of one or more client devices from the second instance to the first instance, and
      executing a shutdown of the second instance.

8. The non-transitory computer-readable storage medium of claim 7, wherein the first instance replicates the first transaction log to the second instance in response to completion of a transaction within the first instance.

9. The non-transitory computer-readable storage medium of claim 8, wherein the transaction comprises at least one write operation.

10. The non-transitory computer-readable storage medium of claim 7, wherein operations further comprise configuring the second instance to replicate a second transaction log to the first instance over the RDMA connection.

11. The non-transitory computer-readable storage medium of claim 7, wherein operations further comprise stopping replication of the first transaction log to the second instance.

12. The non-transitory computer-readable storage medium of claim 7, wherein operations further comprise replicating a second transaction log of the second instance to the first instance after completion of one or more transactions.

13. A system, comprising:
a computing device; and
a computer-readable storage device coupled to the computing device and having instructions stored thereon which, when executed by the computing device, cause the computing device to perform operations for scaling of a system executed within a cloud computing environment, the operations comprising:
providing a first instance of a database system within the cloud computing environment;
determining that scale out of the database system is to be executed, and in response:
providing a second instance of the database system within the cloud computing environment, the first instance and the second instance collectively defining a cluster,
establishing a remote direct memory access (RDMA) connection between the first instance and the second instance to exchange data in main memory,
copying data stored within the first instance to a data store of the second instance over the RDMA connection, and
configuring the first instance to replicate a first transaction log to the second instance over the RDMA connection;
receiving, by each of the first instance and the second instance, requests from one or more client devices; and
determining that scale in of the database system is to be executed, and in response:
setting the second instance to an offline status,
migrating one or more connections of one or more client devices from the second instance to the first instance, and
executing a shutdown of the second instance.

14. The system of claim 13, wherein the first instance replicates the first transaction log to the second instance in response to completion of a transaction within the first instance.

15. The system of claim 14, wherein the transaction comprises at least one write operation.

16. The system of claim 13, wherein operations further comprise configuring the second instance to replicate a second transaction log to the first instance over the RDMA connection.

17. The system of claim 13, wherein operations further comprise stopping replication of the first transaction log to the second instance.

* * * * *